(12) United States Patent
Fujio

(10) Patent No.: US 11,383,939 B2
(45) Date of Patent: Jul. 12, 2022

(54) CONVEYOR

(71) Applicant: DAIFUKU CO., LTD., Osaka (JP)

(72) Inventor: Yoshihiko Fujio, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 0 days.

(21) Appl. No.: 17/175,975

(22) Filed: Feb. 15, 2021

(65) Prior Publication Data

US 2021/0253364 A1  Aug. 19, 2021

(30) Foreign Application Priority Data

Feb. 19, 2020 (JP) .............................. JP2020-025745

(51) Int. Cl.
*B65G 47/82* (2006.01)
*B65G 47/64* (2006.01)
*B65G 13/10* (2006.01)

(52) U.S. Cl.
CPC ............. *B65G 47/82* (2013.01); *B65G 47/64* (2013.01); *B65G 2201/0258* (2013.01)

(58) Field of Classification Search
None
See application file for complete search history.

(56) References Cited

U.S. PATENT DOCUMENTS

| | | | | |
|---|---|---|---|---|
| 1,022,823 A * | 4/1912 | Buck | ...................... | B65G 13/10 193/36 |
| 1,835,823 A | 12/1931 | Taylor | | |
| 2,634,843 A * | 4/1953 | Timmons | ................ | B65G 13/10 193/36 |
| 2,669,334 A * | 2/1954 | Metzgar | .................. | B65G 13/10 193/36 |
| 3,616,892 A * | 11/1971 | Koennecke | ............ | B65G 13/10 198/367 |
| 3,785,469 A * | 1/1974 | Stumpf | .................. | B65G 13/10 193/36 |
| 5,653,325 A * | 8/1997 | Enomoto | ................ | B65G 13/10 198/782 |
| 6,179,113 B1 * | 1/2001 | Wunscher | .............. | B65G 13/10 198/782 |

(Continued)

FOREIGN PATENT DOCUMENTS

DE 102010015584 A1 10/2011
DE 102011015608 A1 10/2012

(Continued)

OTHER PUBLICATIONS

European Search Report from corresponding European Patent Application No. EP21151975, dated Jul. 13, 2021.

(Continued)

*Primary Examiner* — Kavel Singh
(74) *Attorney, Agent, or Firm* — Kusner & Jaffe

(57) ABSTRACT

A conveyor conveys a tray along a transportation path including a linear path and a curved path connected to the linear path. The conveyor includes an orientation assist member configured to assist a change of the conveyance orientation of the tray when the tray is conveyed from the linear path to the curved path. The orientation assist member is provided on the linear path on the upstream side of conveyance from a starting position S of the curved path on the transportation path.

7 Claims, 6 Drawing Sheets

(56) References Cited

U.S. PATENT DOCUMENTS

| | | |
|---|---|---|
| 9,266,677 B2 * | 2/2016 | Isomura .................. B65G 47/54 |
| 2007/0193859 A1 | 8/2007 | Kyutoku et al. |
| 2013/0037388 A1 | 2/2013 | Faist et al. |
| 2013/0220775 A1 | 8/2013 | Faist et al. |
| 2015/0166266 A1 | 6/2015 | Isomura |

FOREIGN PATENT DOCUMENTS

| | | |
|---|---|---|
| GB | 989709 A | 4/1965 |
| JP | 5168794 B2 | 3/2013 |
| JP | 2015-048247 A | 3/2015 |
| JP | 2015-048247 A | 3/2015 |

OTHER PUBLICATIONS

Office Action issued in corresponding Russian Patent Application No. 2021103780/11(008179) dated Sep. 10, 2021.

* cited by examiner

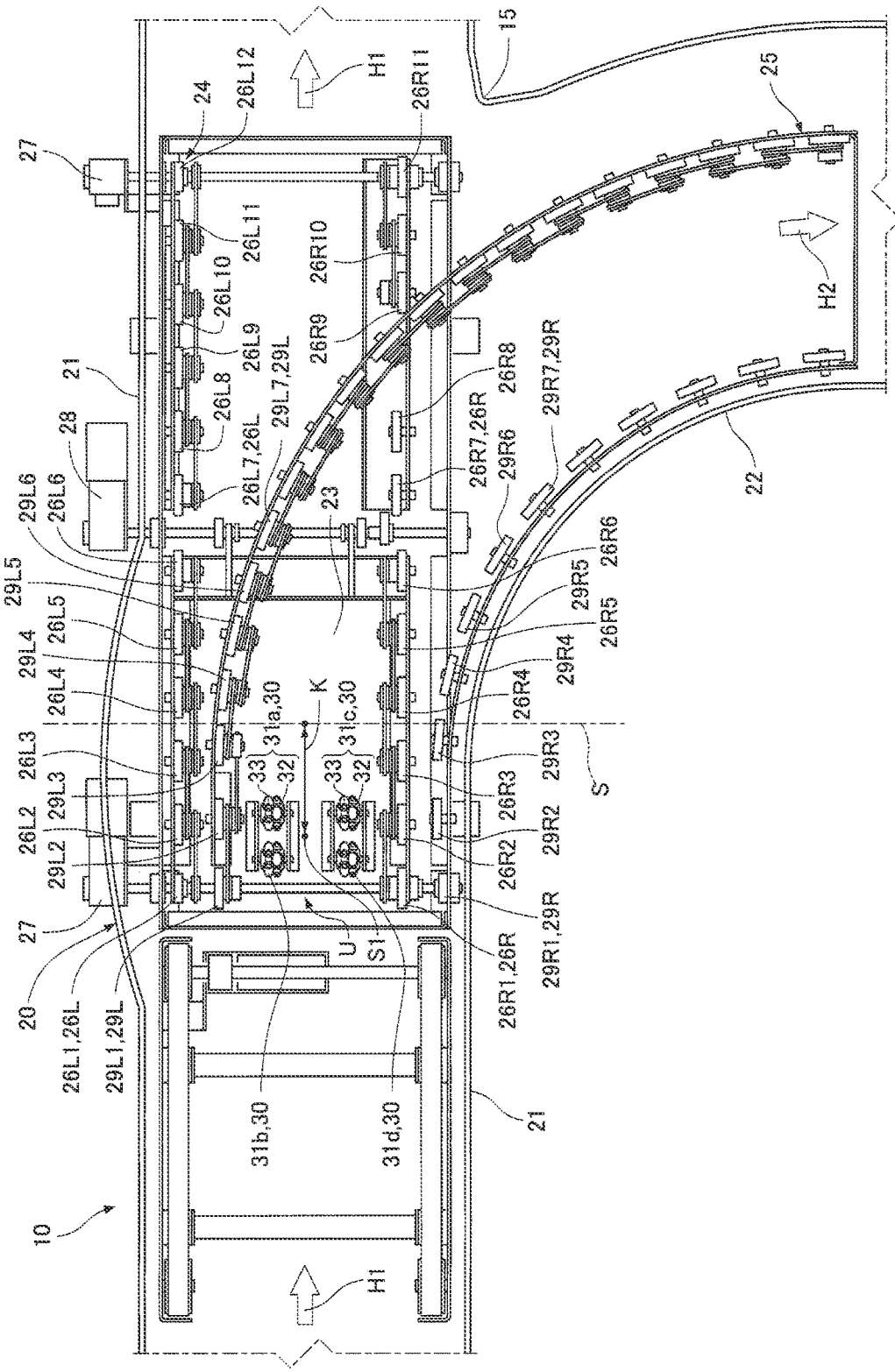

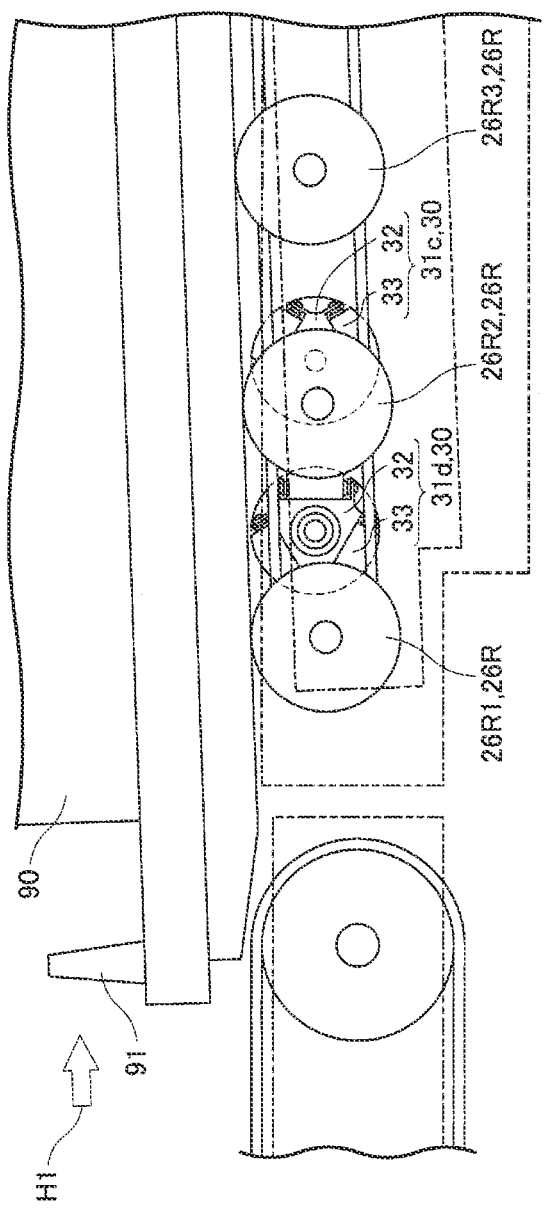

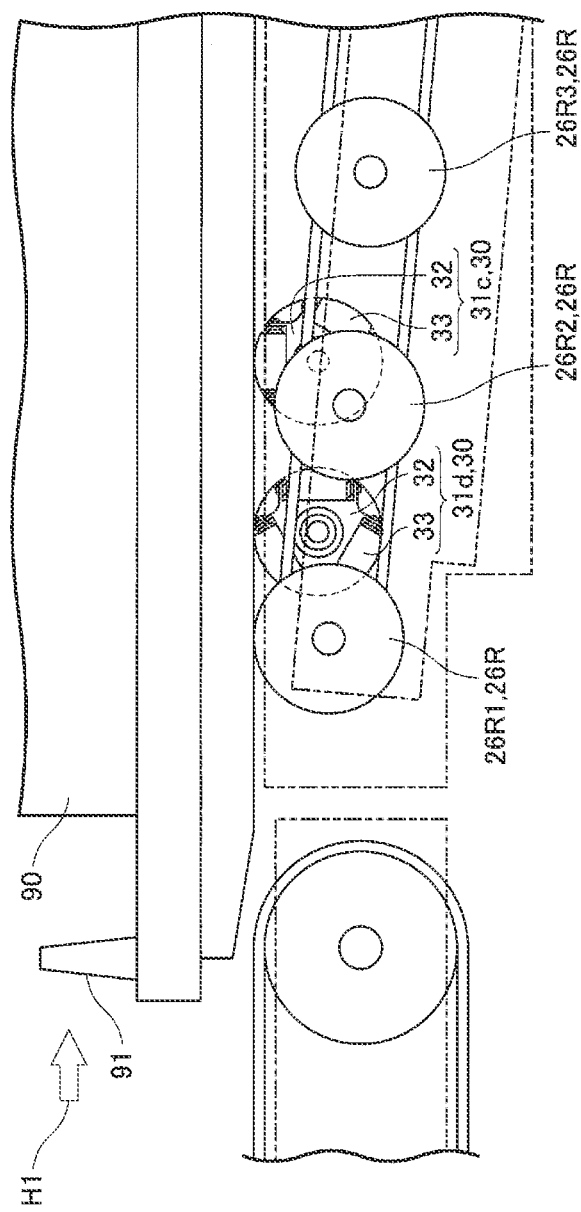

CONVEYOR

FIELD OF THE INVENTION

The present invention relates to a conveyor for conveying conveyed objects along a transportation path including linear paths and curved paths connected to the linear paths.

BACKGROUND OF THE INVENTION

As described in Japanese Patent No. 5168794, a conventionally known conveyor for conveying conveyed objects is provided with a transportation path including a linear path for linearly guiding a conveyed object, a curved path for causing a conveyed object to branch from the linear path, and a branch section having the linear path and the curved path. The linear path, the curved path, and the branch section are combined as necessary.

The conveyor of Japanese Patent No. 5168794 is used when in-process products are conveyed according to a manufacturing process in a manufacturing plant of semiconductors and liquid crystal display panels or the like or when passenger baggage and freight or the like are conveyed to airplanes in a sorting facility for sorting passenger baggage and freight or the like in an airport.

The conveyor provided for a sorting facility in an airport conveys trays (conveyed objects), on which hand baggage and freight are placed, to a desired airplane. In the conveyance of, in particular, freights by the conveyor for a sorting facility in an airplane, multiple freights to be conveyed are to be placed on a single tray. Thus, a long tray with a freight loading part (loading surface) extended in the conveying direction of the tray is used as a tray for placing freight.

As illustrated in FIGS. 5A to 5C, when a conveyor 100 of the related art described in Japanese Patent No. 5168794 conveys freights 95 by using a long tray 91 extended as has been discussed, the tray 91 with the freights 95 placed thereon turns conveying directions from a linear path 121 to a curved path 122. In this case, as illustrated in FIG. 5A, a front end F of the tray 91 is conveyed to a starting position S0 of the curved path 122 on a transportation path 120. As illustrated in FIG. 5B, when the front-half region of the tray 91 (hereinafter, will be referred to as "front half 92 of the tray 91") with respect to the conveying direction of the tray 91 is being guided to the curved path 122, the rear-half region of the tray 91 (hereinafter, will be referred to as "rear half 93 of the tray 91") is being moved to the left (in a direction opposite to the curved path 122 (a conveying direction H2 of the tray 91 on the curved path 122)) with respect to a conveying direction H1 of the tray 91 on the linear path 121 by a force for guiding the front half 92 of the tray 91 to the curved path 122 by the conveyor 100. In other words, when the front half 92 of the tray 91 changes from the orientation of conveyance to the linear path 121 to the orientation of conveyance to the curved path 122, the rear half 93 of the tray 91 changes from the orientation of conveyance to the linear path 121 to the orientation of conveyance to the curved path 122, accordingly.

However, in the conveyor 100 of the related art, when the long tray 91 is used to convey the freights 95, a load applied to the tray 91 may be biased to the rear of the tray 91, that is, a rearward load may be applied depending upon the position, size, and the number of freights 95 placed on the tray 91. When the tray 91 with a rearward load is conveyed by the conveyor 100 of the related art, as illustrated in FIG. 5C, a resistance increases relative to the sliding of the rear half 93 of the tray 91 in the conveyance of the tray 91 from the linear path 121 to the curved path 122. This disturbs the balance between a force for turning the front half 92 of the tray 91 to the curved path 122 and a force for sliding the rear half 93 of the tray 91 to the left relative to the conveying direction H1 of the tray 91. Thus, the rear half 93 of the tray 91 cannot be changed to the orientation of conveyance to the curved path 122 when the front half 92 of the tray 91 is changed to the orientation of conveyance to the curved path 122, so that the tray 91 with a rearward load may not fully turn to the curved path 122 and the front half 92 of the tray 91 may collide with a corner guide 123.

SUMMARY OF THE INVENTION

It is an object of the present invention is to provide a conveyor capable of conveying a conveyed object from a linear path to a curved path even if a load applied to the conveyed object is biased to the rear side of the conveyed object, that is, a rearward load is applied to the conveyed object.

A solution to the technical problem of the present invention will be described below.

A conveyor according to the present invention is a conveyor for conveying a conveyed object along a transportation path including a linear path and a curved path connected to the linear path, the conveyor including an orientation assist member configured to assist a change of the conveyance orientation of the conveyed object when the conveyed object is conveyed from the linear path to the curved path, wherein the orientation assist member is provided on the linear path on the upstream side of conveyance from the starting position of the curved path on the transportation path.

In this configuration, when the conveyed object is conveyed from the linear path to the curved path, the orientation assist member assists a change of the conveyance orientation of the conveyed object (a change of the conveyance orientation from the orientation of conveyance to the linear path to the orientation of conveyance to the curved path) on the linear path on the upstream side of conveyance from the starting position of the curved path on the transportation path.

In this case, the curved path connected to the linear path means a curved path continuing from one end of the linear path (a curved path forming a corner of the transportation path), a curved path branching from one side of the linear path (a curved path forming a branch section of the transportation path), and a curved path joining one side of the linear path (a curved path forming a junction of the transportation path). Moreover, a change of the conveyance orientation of the conveyed object during the conveyance of the conveyed object from the linear path to the curved path means a change of the conveyance orientation of the conveyed object from the orientation of conveyance to the linear path to the orientation of conveyance to the curved path.

Furthermore, the orientation assist member is provided in a predetermined range around a position on the linear path, the position being separated at a predetermined distance on the upstream side of conveyance from the starting position of the curved path on the transportation path, and the predetermined distance is a distance corresponding to a quarter of the length of the conveyed object in the conveying direction.

In this configuration, when the center of the conveyed object is conveyed to the starting position of the curved path on the transportation path, the orientation assist member assists a change of the conveyance orientation of the conveyed object such that the conveyance orientation of the conveyed object of the rear half with respect to the conveying direction of the conveyed object is changed from the orientation of conveyance to the linear path to the orientation of conveyance to the curved path.

Furthermore, the orientation assist member includes a rotating body, and the rotating body capable of freely changing the rotation direction according to a change of the conveyance orientation of the object conveyed to the curved path assists the change of the conveyance orientation of the conveyed object during the conveyance of the conveyed object to the curved path.

In this configuration, the orientation assist member changes the rotation direction of the rotating body according to a change of the conveyance orientation of the object conveyed to the curved path, so that a change of the conveyance orientation of the conveyed object is assisted such that the conveyance orientation of the conveyed object is changed from the orientation of conveyance to the linear path to the orientation of conveyance to the curved path.

Furthermore, the orientation assist member includes a rotating body, and the rotating body that rotates in a direction at a predetermined angle with respect to the conveying direction of the conveyed object on the linear path assists a change of the conveyance orientation of the conveyed object during the conveyance of the conveyed object to the curved path.

In this configuration, the rotating body rotates in the direction at the predetermined angle with respect to the conveying direction of the conveyed object on the linear path, so that the orientation assist member assists a change of the conveyance orientation of the conveyed object such that the conveyance orientation of the conveyed object is changed from the orientation of conveyance to the linear path to the orientation of conveyance to the curved path.

Furthermore, the rotating body is rotated in contact with the conveyed object.

In this configuration, the rotating body is rotated in contact with the conveyed object, so that the orientation assist member assists a change of the conveyance orientation of the conveyed object such that the conveyance orientation of the conveyed object is changed from the orientation of conveyance to the linear path to the orientation of conveyance to the curved path.

According to the conveyor of the present invention, when the conveyed object is conveyed from the linear path to the curved path, the orientation assist member assists a change of the conveyance orientation of the conveyed object (a change of the conveyance orientation from the orientation of conveyance to the linear path to the orientation of conveyance to the curved path) on the linear path on the upstream side of conveyance from the starting position of the curved path on the transportation path. Thus, a resistance against the sliding of the rear half of the conveyed object is reduced, the resistance being caused by a rearward load of the conveyed object, and the balance is kept between a force for turning the front half of the conveyed object to the curved path and a force for moving the rear half of the conveyed object in a direction opposite to the curved path. Thus, when the front half of the conveyed object changes to the orientation of conveyance to the curved path, the rear half of the conveyed object can be changed to the orientation of conveyance to the curved path. This allows the conveyed object with a rearward load to fully turn to the curved path without colliding with the corner guide of the curved path.

BRIEF DESCRIPTION OF THE DRAWINGS

FIG. 1 is a plan view of a branch section of a conveyor according to the present invention;

FIG. 4A is a side view illustrating the vicinity of an orientation assist member when the tray at the branch section is conveyed along the linear path by the conveyor according to the present invention;

FIG. 4B is a side view illustrating the vicinity of the orientation assist member when the tray at the branch section is conveyed along the curved path by the conveyor according to the present invention;

DETAILED DESCRIPTION OF THE INVENTION

A conveyor 10 according to an embodiment of the present invention will be described below.

Figure 2A:
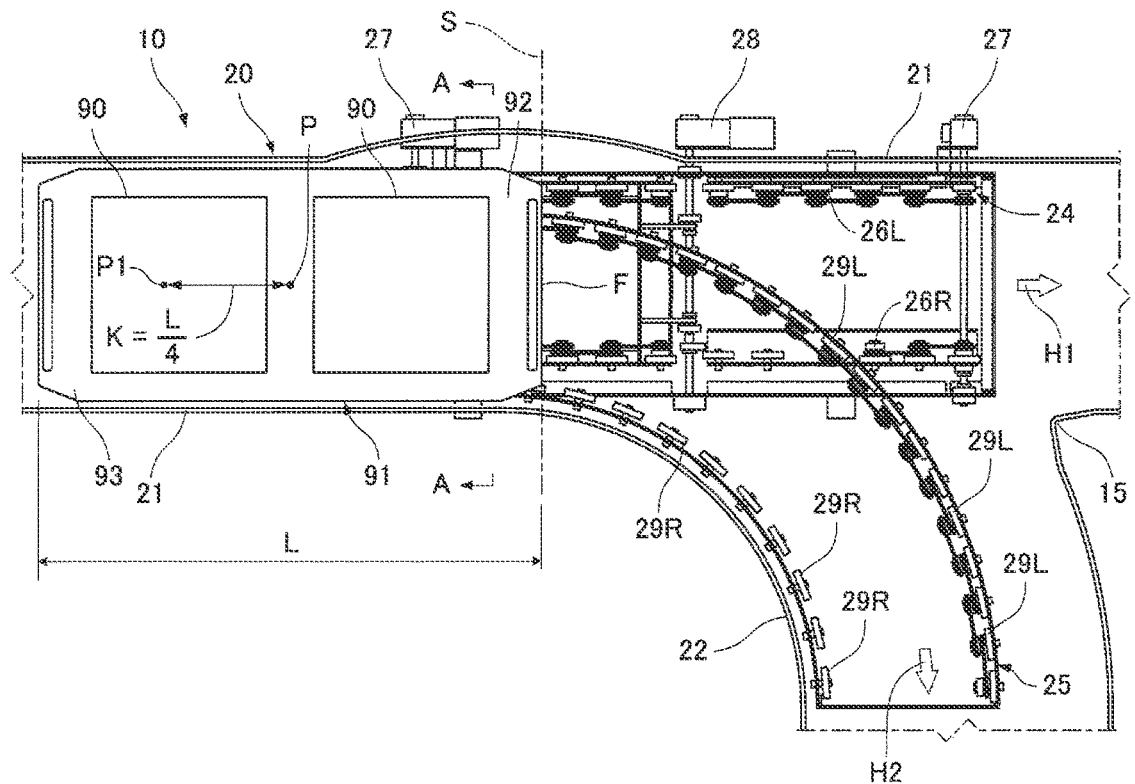
FIG. 2A is a plan view illustrating a tray conveyed to the branch section of the conveyor according to the present invention.
Figure 2B:
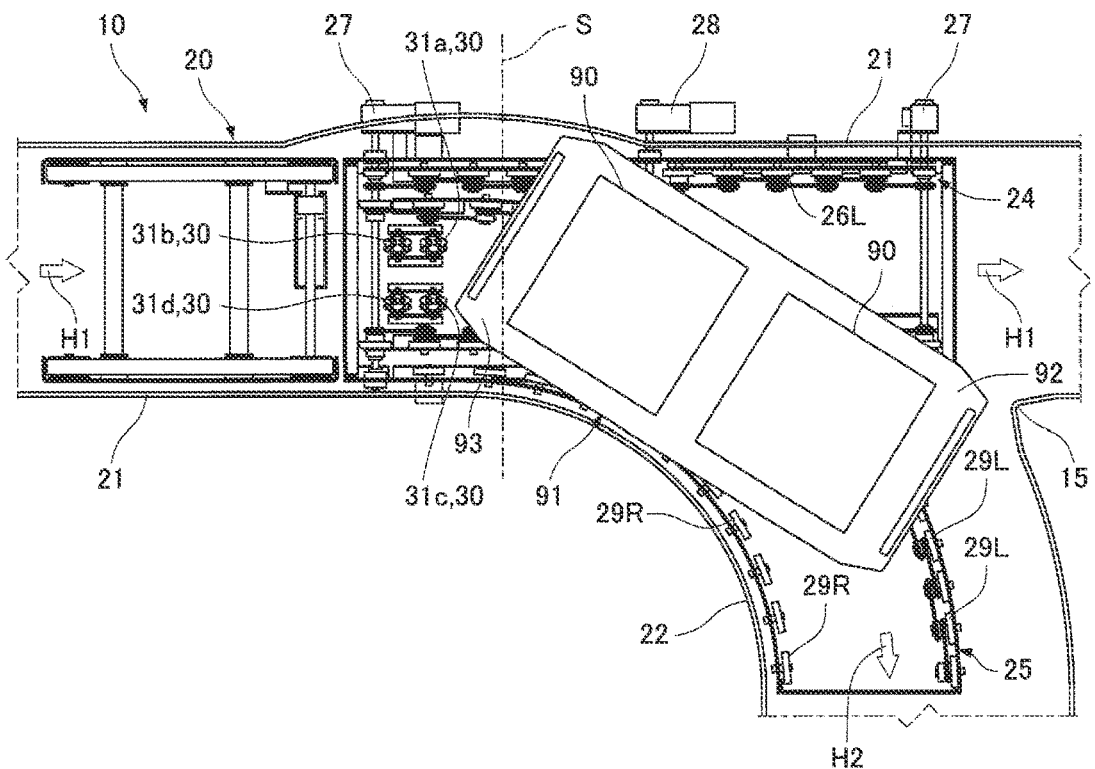
FIG. 2B is a plan view illustrating the tray conveyed along a curved path of the conveyor according to the present invention.

The conveyor 10 is provided in a sorting facility (illustrated) for sorting hand baggage or freights in, for example, an airport or a distribution center. As illustrated in FIGS. 1, 2A, and 2B, the conveyor 10 conveys a tray 91 (an example of "conveyed object"), on which articles 90 such as hand baggage or freights are placed, along a transportation path 20.

As illustrated in FIGS. 2A, and 2B, the tray 91 conveyed by the conveyor 10 is a long plate on which the articles 90 can be placed and has a length L in the longitudinal direction. The tray 91 is conveyed along the transportation path 20 such that the longitudinal direction is placed along a conveying direction (the longitudinal direction along the conveying direction of the tray 91). On the tray 91, the articles 90 are respectively placed in a front-half region in the longitudinal direction of the tray 91 (a front half 92 of the tray 91) and a rear-half region in the longitudinal direction of the tray 91 (a rear half 93 of the tray 91). A line passing through a center P of the tray 91 in the width direction serves as the boundary of the regions. In FIGS. 2A and 2B, the articles 90 are placed in the front half 92 of the tray 91 and the rear half 93 of the tray 91 for convenience of explanation. The positions of the articles 90 placed on the tray 91 are not limited to the front half 92 of the tray 91 and the rear half 93 of the tray 91.

The transportation path 20 where the tray 91 is conveyed includes a linear path 21, a curved path 22, and a branch section 23 where the curved path 22 branches from one side of the linear path 21 (in FIG. 1, from the right side in a conveying direction H of the tray 91 on the linear path 21). The linear path 21, the curved path 22, and the branch section 23 are combined as necessary.

As illustrated in FIG. 1, at the branch section 23, a linear track 24 and a branch track 25 partially overlap each other. The linear track 24 is provided for guiding the tray 91 guided from the linear path 21 on the upstream side of conveyance, to the linear path 21 on the downstream side of conveyance. The branch track 25 is provided for guiding the tray 91 guided from the linear path 21 on the upstream side of conveyance, to the curved path 22 branching to the downstream side of conveyance. The linear track 24 and the branch track 25 have a top upstream position U on the linear path 21, on the upstream side of conveyance from a starting position S of the curved path 22 on the transportation path 20. The tracks extending downstream from the top upstream position U are formed so as to partially overlap each other.

The linear track 24 includes a plurality of right-side rollers 26R and a plurality of left-side rollers 26L. The right-side rollers 26R and the left-side rollers 26L are provided at predetermined intervals in a frame, which is not illustrated, and roll to move the tray 91 to the linear path 21. The right-side rollers 26R and the left-side rollers 26L are driving rollers that are driven by a drive motor 27. The right-side rollers 26R or the left-side rollers 26L may be driving rollers and the other rollers may be driven rollers.

As illustrated in FIGS. 1 to 4B, from among the right-side rollers 26R and the left-side rollers 26L, right-side rollers 26R1 to 26R6 and left-side rollers 26L1 to 26L6 that overlap a plurality of right-side rollers 29R and a plurality of left-side rollers 29L of the branch track 25 are configured so as to vertically move between a position (FIG. 4A) for conveying the tray 91 to the linear path 21 and a position (FIG. 4B) for conveying the tray 91 to the curved path 22. The right-side rollers 26R1 to 26R6 and the left-side rollers 26L1 to 26L6 are vertically moved by the driving of a drive motor 28 with the right-side roller 26R1 (left-side roller 26L1) serving as a pivot. When the tray 91 is conveyed to the linear path 21, the right-side rollers 26R1 to 26R6 and the left-side rollers 26L1 to 26L6 are kept at a predetermined position such that the roller height (a height determined by the tangent of the highest point of the right-side rollers 26R and the left-side rollers 26L) is equal to the roller height of the right-side roller 29R1 and the left-side roller 29L1 of the branch track 25 (a height determined by the tangent of the highest point of the right-side rollers 29R and the left-side rollers 29L) and is higher than the roller height of the right-side rollers 29R2 to 29R6 and the left-side rollers 29L2 to 29L6. Specifically, as illustrated in FIG. 3A, the highest point of the right-side rollers 26R and the left-side rollers 26L is kept at a position in contact with the bottom of the tray 91, whereas the highest point of the right-side rollers 29R2 to 29R6 and the left-side rollers 29L2 to 29L6 of the branch track 25 is kept at a position lower than the highest point of the right-side rollers 26R and the left-side rollers 26L. The roller height of the right-side rollers 26R and the left-side rollers 26L may be kept higher than the roller height of the right-side roller 29R1 and the left-side roller 29L1 of the branch track 25.

Figure 3A:
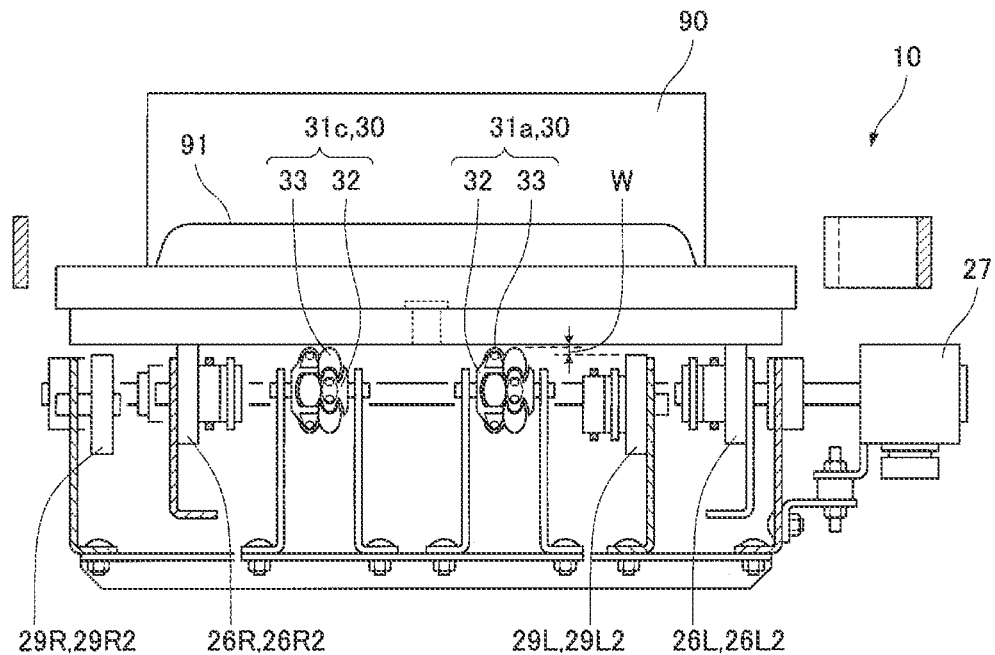
FIG. 3A is a cross-sectional view taken along line A-A of FIG. 2A when the tray is conveyed along a linear path.
Figure 3B:
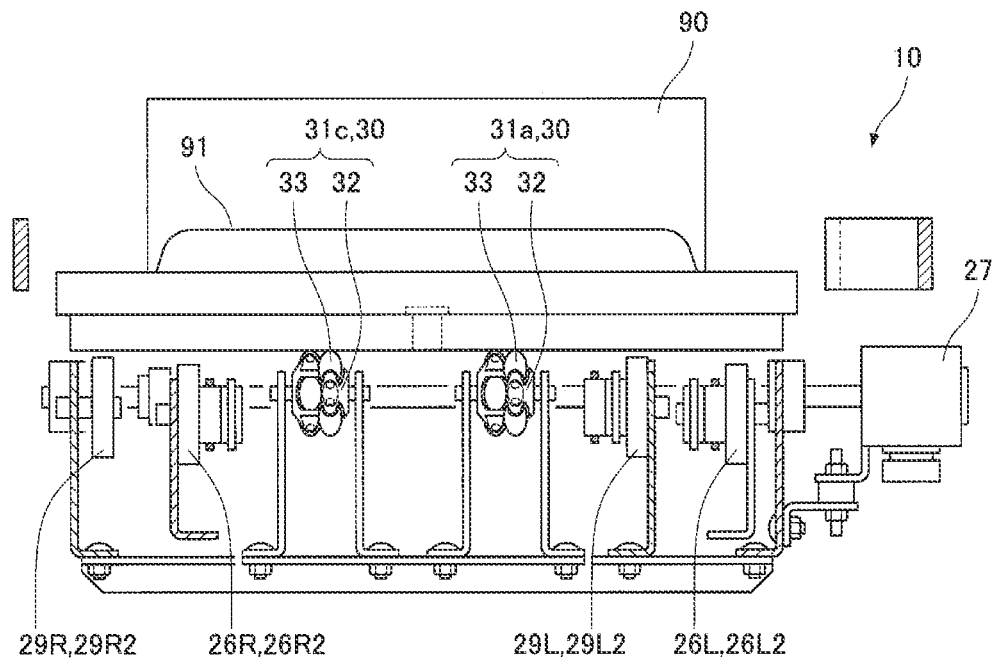
FIG. 3B is a cross-sectional view taken along line A-A of FIG. 2A when the tray is conveyed along the curved path.
Figure 5A:
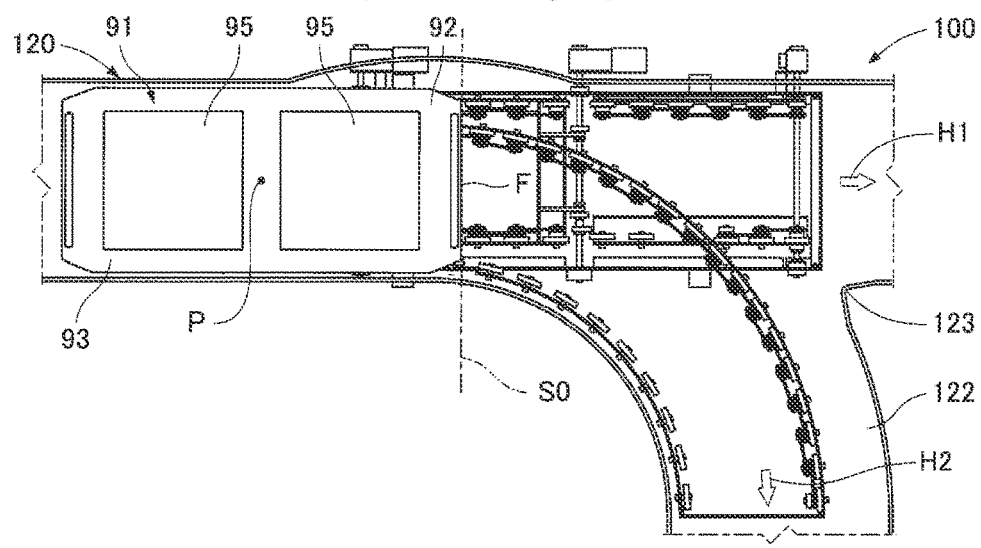
FIG. 5A is a plan view immediately before a tray enters a curved path, the tray being conveyed at a branch section along the curved path by a conveyor of the related art.
Figure 5B:
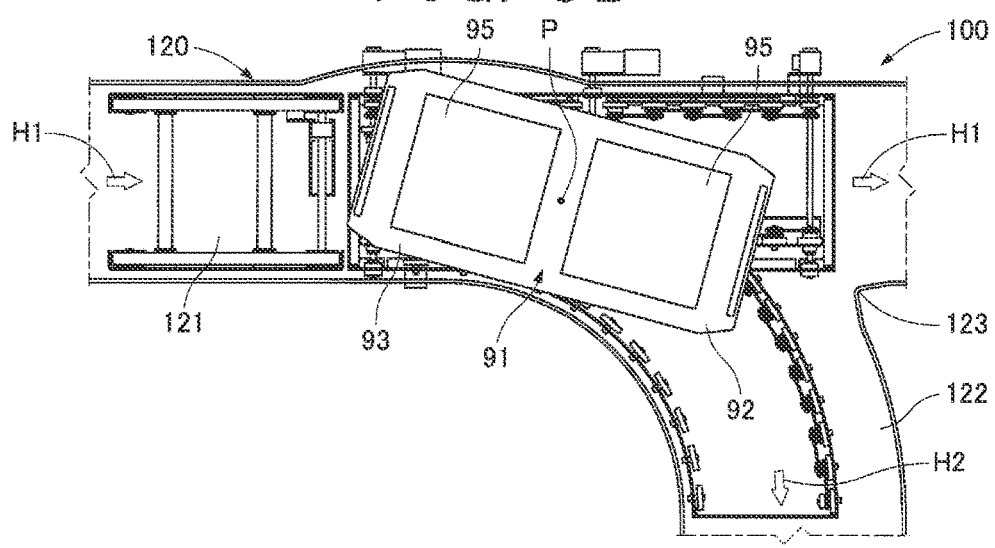
FIG. 5B is a plan view when the tray enters the curved path, the tray being conveyed at the branch section along the curved path by the conveyor of the related art.
Figure 5C:
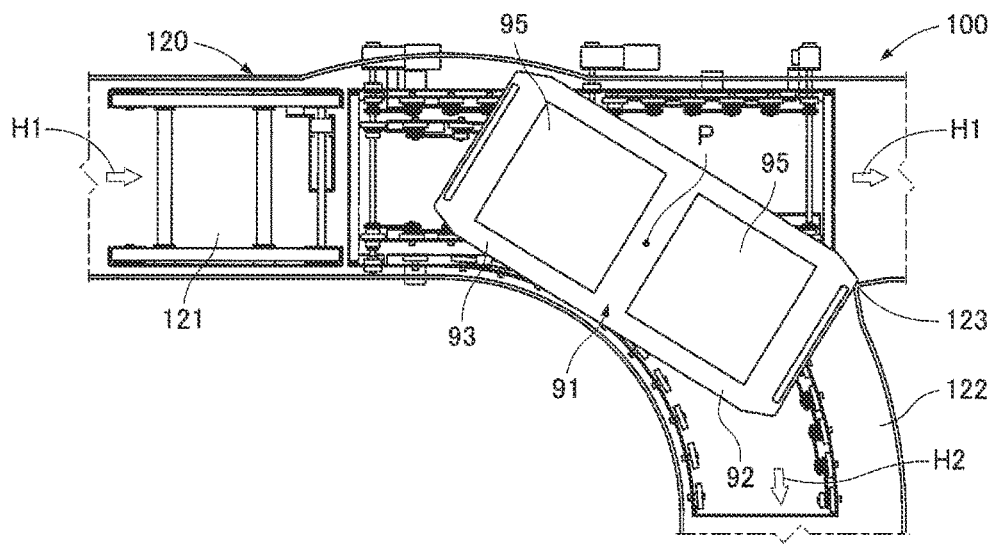
FIG. 5C is a plan view immediately after the tray enters the curved path, the tray being conveyed at the branch section along the curved path by the conveyor of the related art.

As illustrated in FIG. 3B, when the tray 91 is conveyed to the curved path 22, the right-side rollers 26R and the left-side rollers 26L move downward such that the roller height is lower than that of the right-side rollers 29R and the left-side rollers 29L of the branch track 25.

As illustrated in FIG. 1, from among the right-side rollers 26R and the left-side rollers 26L, right-side rollers 26R7 to 26R11 and left-side rollers 26L7 to 26L12 that are positioned downstream of the right-side roller 26R6 and the left-side roller 26L6 are always kept at a constant roller height. The roller height is not changed in the conveyance of the tray 91 to the linear path 21 and the conveyance of the tray 91 to the curved path 22. The roller height of the right-side rollers 26R7 to 26R11 and the left-side rollers 26L7 to 26L12 may be changed when the rollers are vertically moved to convey the tray 91 to the linear path 21 or the curved path 22 with the right-side roller 26R11 (left-side roller 26L12) serving as a pivot. When the tray 91 is conveyed to the linear path 21, the right-side rollers 26R7 to 26R11 and the left-side rollers 26L7 to 26L12 are kept at a predetermined position such that the roller height is higher than the roller height of the right-side rollers 29R and the left-side rollers 29L, that is, the right-side rollers from 29R7 and the left-side rollers from 29L7 of the branch track 25. When the tray 91 is conveyed to the curved path 22, the right-side rollers 26R7 to 26R11 and the left-side rollers 26L7 to 26L12 are moved downward such that the roller height is lower than the roller height of the right-side rollers 29R and the left-side rollers 29L, that is, the right-side rollers from 29R7 and the left-side rollers from 29L7 of the branch track 25.

From among the right-side rollers 26R and the left-side rollers 26L, the right-side roller 26R1 and the left-side roller 26L1 at the top upstream position U of the linear track 24 have the lowest roller height. The right-side rollers 26R1 to 26R6 and the left-side rollers 26L1 to 26L6 are disposed at predetermined intervals toward the downstream side of the linear track 24 so as to gradually increase in roller height from the right-side roller 26R1 and the left-side roller 26L1. The right-side rollers 26R and the left-side rollers 26L downstream of the right-side roller 26R6 and the left-side roller 26L6, that is, right-side rollers 26R and the left-side rollers 26L from the right-side roller 26R7 and the left-side roller 26L7 are kept at a constant roller height and are disposed at predetermined intervals toward the downstream side of the linear track 24.

The branch track 25 includes the right-side rollers 29R and the left-side rollers 29L. The right-side rollers 29R and the left-side rollers 29L are provided at predetermined intervals in a frame, which is not illustrated, and roll to move the tray 91 to the curved path 22. The left-side rollers 29L are driving rollers that are driven by the drive motor 27. The right-side rollers 29R are driven rollers that are rolled in contact with the tray 91. The right-side rollers 29R and the left-side rollers 29L may be driving rollers.

The right-side rollers 29R and the left-side rollers 29L are disposed at predetermined intervals toward the downstream side of the branch track 25 such that rollers of the right-side rollers 29R and rollers of the left-side rollers 29L are kept at a constant roller height respectively.

As illustrated in FIGS. 1, 3A, and 3B, at the top upstream position U of the linear track 24 and the branch track 25, an orientation assist member 30 for assisting the conveyance orientation of the tray 91 is provided. When the tray 91 is conveyed from the linear path 21 to the curved path 22, the orientation assist member 30 assists a change of the conveyance orientation of the tray 91 from the orientation of conveyance to the linear path 21 to the orientation of conveyance to the curved path 22. The orientation assist member 30 includes four wheels 31a, 31b, 31c, and 31d (an example of "rotating body") of Omni wheels (registered trademark).

The wheels 31a, 31b, 31c, and 31d each include a body part 32 and a barrel-shaped roller 33 (an example of "rotating body") provided on the circumference of the body part 32. The wheels 31a, 31b, 31c, and 31d can freely change the rotation directions of the wheels according to a change of the conveyance orientation of the tray 91 being conveyed to the curved path 22, by combining the rotation of the body part 32 (a movement in the conveying direction H1 of the tray 91) and the rotation of the barrel-shaped roller 33 (a movement in a direction horizontally perpendicular to the conveying direction H1 of the tray 91). The body part 32 rotates in the same direction as the conveying direction H1 of the tray 91 on the linear path 21. The barrel-shaped roller 33 rotates in the direction horizontally perpendicular to the conveying direction H1 of the tray 91 on the linear path 21 (an example of "a direction at a predetermined angle with respect to the conveying direction of a conveyed object on the linear path"). The wheels 31a, 31b, 31c, and 31d are driven wheels that are rotated when the barrel-shaped rollers 33 come into contact with the tray 91. In other words, the wheels 31a, 31b, 31c, and 31d each rotate the barrel-shaped roller 33 and the body part 32 when the barrel-shaped roller 33 comes into contact with the tray 91.

As illustrated in FIG. 1, the wheels 31a, 31b, 31c, and 31d are disposed in a predetermined range around a position S1 on the linear path 21, the position S1 being separated at a predetermined distance K on the upstream side of conveyance from the starting position S of the curved path 22 on the transportation path 20. As illustrated in FIG. 2A, the predetermined distance K is a distance corresponding to a length from the center P of the tray 91 to a center P1 of the rear half 93 of the tray 91. In other words, the predetermined distance K is a distance corresponding to a quarter of the length L (L/4) in the longitudinal direction of the tray 91 (the length of the tray 91 in the conveying direction). The rear half 93 of the tray 91 is the rear-half region of an effective bottom that can be brought into contact with the right-side rollers 26R, the left-side rollers 26L, the right-side rollers 29R, the left-side rollers 29L, and the wheels 31a, 31b, 31c, and 31d at the bottom of the tray 91. Furthermore, the predetermined range around the position S1 on the linear path 21 is a range where the rear half 93 of the tray 91 covers the linear path 21 when the center P1 of the rear half 93 of the tray 91 conveyed on the linear path 21 reaches the position S1 on the linear path 21.

As illustrated in FIGS. 1, 3A, and 3B, the four wheels 31a, 31b, 31c, and 31d are disposed at equal distances with respect to the position S1 on the linear path 21 and are provided between a second right-side roller 26R2 constituting the linear track 24 and a second left-side roller 29L2 constituting the branch track 25. Specifically, the wheels 31a and 31b are disposed on the left side of the conveying direction H1 of the tray 91 with respect to the position S1 so as to be opposed to the second left-side roller 29L2. The wheels 31c and 31d are disposed on the right side of the conveying direction H1 of the tray 91 with respect to the position S1 so as to be opposed to the second right-side roller 26R2. The wheel 31a is linearly disposed with the wheel 31b along the linear path 21. The wheel 31c is linearly disposed with the wheel 31d along the linear path 21. Moreover, the wheel 31a is opposed to the wheel 31c in a direction horizontally perpendicular to the linear path 21. The wheel 31b is opposed to the wheel 31d in the direction horizontally perpendicular to the linear path 21. The four wheels 31a, 31b, 31c, and 31d are disposed in the predetermined range around the position S1 on the linear path 21. Thus, when the center P1 of the rear half 93 of the tray 91 conveyed on the linear path 21 reaches the position S1 on the linear path 21, the four wheels 31a, 31b, 31c, and 31d can be evenly brought into contact with the bottom of the rear half 93 of the tray 91 and the bottom of the rear half 93 of the tray 91 can be evenly supported by the four wheels 31a, 31b, 31c, and 31d.

As illustrated in FIG. 3A, the wheels 31a, 31b, 31c, and 31d are disposed such that the roller height of the wheels (a height determined by the tangent of the highest point of the barrel-shaped roller 33 that is brought to the top position of the body part 32 by the rotation of the body part 32) is lower than the roller height of the second right-side roller 26R2 and the second left-side roller 26L2 in the conveyance of the tray 91 to the linear path 21, and the roller height of the wheels is higher by a height W than the roller height of a second right-side roller 29R2 and the second left-side roller 29L2 constituting the branch track 25. In other words, the wheels 31a, 31b, 31c, and 31d are desirably disposed with a roller height between the roller height of the second right-side roller 26R2 and the second left-side roller 26L2 and the roller height of the second right-side roller 29R2 and the second left-side roller 29L2 in the conveyance of the tray 91 to the linear path 21. By the arrangement of the wheels 31a, 31b, 31c, and 31d, when the tray 91 is conveyed to the linear path 21, the second right-side roller 26R2 and the second left-side roller 26L2 that constitute the linear track 24 are brought into contact with the bottom of the tray 91. When the tray 91 is conveyed to the curved path 22, the second right-side roller 26R2 and the second left-side roller 26L2 move downward to bring the wheels 31a, 31b, 31c, and 31d into contact with the bottom of the tray 91.

The roller height of the wheels 31a, 31b, 31c, and 31d may be increased without interfering with the conveyance of the tray 91 to the linear path 21 as long as the roller height is higher than that of the second right-side roller 29R2 and the second left-side roller 29L2.

As illustrated in FIG. 3B, the wheels 31a, 31b, 31c, and 31d support the bottom of the rear half 93 of the tray 91 when the barrel-shaped roller 33 comes into contact with the bottom of the tray 91 during the conveyance of the tray 91 from the linear path 21 to the curved path 22. Furthermore, by the rotations of the body parts 32 and the barrel-shaped rollers 33, the wheels 31a, 31b, 31c, and 31d move the rear half 93 of the tray 91 to the left with respect to the conveying direction H1 of the tray 91 on the linear path 21 (in a direction opposite to the curved path 22 (a conveying direction H2 of the tray 91 on the curved path 22)) as illustrated in FIG. 2B. In other words, the wheels 31a, 31b, 31c, and 31d assist a change of the orientation conveyance for the rear half 93 of the tray 91 from the orientation of conveyance to the linear path 21 to the orientation of conveyance to the curved path 22.

The movements of the tray 91 at the branch section 23 of the conveyor 10 will be described below.

At the branch section 23 of the conveyor 10, the tray 91 is conveyed from the linear path 21 upstream of the branch section 23 to the linear path 21 downstream of the branch section 23. Alternatively, the tray 91 is conveyed from the linear path 21 upstream of the branch section 23 to the curved path 22 downstream of the branch section 23.

The tray 91 is conveyed to the linear path 21 downstream of the branch section 23 by the right-side rollers 26R and the left-side rollers 26L of the linear track 24. As illustrated in FIGS. 3A and 4A, when the tray 91 is conveyed to the linear path 21, the roller height of the right-side rollers 26R2 to 26R6 and the left-side rollers 26L2 to 26L6 are kept higher than the roller height of the right-side rollers 29R1 to 29R6 and the left-side rollers 29L1 to 29L6 of the branch track 25. The tray 91 is conveyed to the linear path 21 by the rotations of the right-side rollers 26R and the left-side rollers 26L.

The tray 91 is conveyed to the curved path 22 downstream of the branch section 23 by the right-side rollers 29R and the left-side rollers 29L of the branch track 25. As illustrated in FIGS. 3B and 4B, when the tray 91 is conveyed to the curved path 22, the right-side rollers 26R2 to 26R6 and the left-side rollers 26L2 to 26L6 of the linear track 24 move downward such that the roller height is lower than the roller height of the right-side rollers 29R1 to 29R6 and the left-side rollers 29L1 to 29L6 of the branch track 25 and the roller height of the wheels 31a, 31b, 31c, and 31d. Specifically, in order to prevent the reception of a resistance from the right-side rollers 26R1 to 26R6 and the left-side rollers 26L1 to 26L6 of the linear track 24, the right-side rollers 29R1 to 29R6 and the left-side rollers 29L1 to 29L6 of the branch track 25 and the wheels 31a, 31b, 31c, and 31d of the orientation assist member 30 are disposed at a roller height that is higher than that of the right-side rollers 26R1 to 26R6 and the left-side rollers 26L1 to 26L6 of the linear track 24. The tray 91 is conveyed to the curved path 22 by the driving of the rotations of the left-side rollers 29L.

As illustrated in FIGS. 2A and 2B, when a front end F (a leading end of the front half 92 of the tray 91) of the tray 91 is conveyed to the starting position S of the curved path 22 on the transportation path 20 and the front half 92 of the tray 91 is guided to the curved path 22 by the right-side rollers 29R and the left-side rollers 29L of the branch track 25, the conveyance orientation of the tray 91 is changed from the orientation of conveyance to the linear path 21 to the orientation of conveyance to the curved path 22 by a force for guiding the front half 92 of the tray 91 to the curved path 22 by the left-side rollers 29L of the branch track 25. Specifically, the front half 92 of the tray 91 is being turned to the curved path 22, and the rear half 93 of the tray 91 is being slid to the left with respect to the conveying direction H1 of the tray 91 on the linear path 21 (in a direction opposite to the curved path 22 (the conveying direction H2 of the tray 91 on the curved path 22)).

In this case, if a load is substantially uniformly applied to the front half 92 and the rear half 93 of the tray 91, the rear half 93 of the tray 91 slides when the front half 92 of the tray 91 is being turned to the curved path 22. In other words, when the front half 92 of the tray 91 changes from the orientation of conveyance to the linear path 21 to the orientation of conveyance to the curved path 22, the rear half 93 of the tray 91 is being changed from the orientation of conveyance to the linear path 21 to the orientation of conveyance to the curved path 22. This guides the tray 91 to the curved path 22 without colliding the front half 92 of the tray 91 with a corner guide 15.

If a load applied to the tray 91 is biased to the rear half 93 of the tray 91 (rearward load), a resistance against the sliding of the tray 91 increases. This disturbs the balance between a force for turning the front half 92 of the tray 91 to the curved path 22 and a force for sliding the rear half 93 of the tray 91. Thus, the rear half 93 of the tray 91 cannot slide when the front half 92 of the tray 91 is being turned to the curved path 22. Specifically, the rear half 93 of the tray 91 cannot be changed from the orientation of conveyance to the linear path 21 to the orientation of conveyance to the curved path 22 when the front half 92 of the tray 91 is changed from the orientation of conveyance to the linear path 21 to the orientation of conveyance to the curved path 22, so that the tray 91 cannot fully turn to the curved path 22 and the front half 92 of the tray 91 collides with the corner guide 15.

Thus, in the conveyor 10, the orientation assist member 30 is disposed in the predetermined range around the position S1 on the linear path 21, thereby reducing a resistance against the sliding of the tray 91, the resistance being caused by a rearward load of the tray 91. Specifically, when the front half 92 of the tray 91 is turning to the curved path 22, the rear half 93 of the tray 91 comes into contact with the barrel-shaped rollers 33 of the wheels 31a, 31b, 31c, and 31d of the orientation assist member 30. The rear half 93 of the tray 91 comes into contact with the barrel-shaped rollers 33, so that the barrel-shaped rollers 33 rotate and move the rear half 93 of the tray 91 to the left with respect to the conveying direction H1 of the tray 91. Thus, the sliding of the rear half 93 of the tray 91 is assisted by the rotations of the wheels 31a, 31b, 31c, and 31d, facilitating the sliding of the rear half 93 of the tray 91 to the left with respect to the conveying direction H1 of the tray 91. In other words, a change of conveyance orientation is assisted for the rear half 93 of the tray 91 by the orientation assist member 30, facilitating a change of the conveyance orientation of the rear half 93 of the tray 91 from the orientation of conveyance to the linear path 21 to the orientation of conveyance to the curved path 22. Hence, the conveyance orientation of the rear half 93 of the tray 91 can be changed according to a change of the conveyance orientation of the front half 92 of the tray 91.

As described above, according to the present embodiment, when the tray 91 is conveyed from the linear path 21 to the curved path 22, the orientation assist member 30 assists a change of the conveyance orientation of the tray 91 (a change of the conveyance orientation of the tray 91 from the orientation of conveyance to the linear path 21 to the orientation of conveyance to the curved path 22) on the linear path 21 on the upstream side of conveyance from the starting position S of the curved path 22 on the transportation path 20. Thus, a resistance against the sliding of the rear half 93 of the tray 91 is reduced, the resistance being caused by a rearward load of the tray 91, and the balance is kept between a force for turning the front half 92 of the tray 91 to the curved path 22 and a force for moving the rear half 93 of the tray 91 in a direction opposite to the curved path 22. Thus, when the front half 92 of the tray 91 changes to the orientation of conveyance to the curved path 22, the rear half 93 of the tray 91 can be changed to the orientation of conveyance to the curved path 22. This allows the tray 91 with a rearward load to fully turn to the curved path 22 without colliding with the corner guide 15 of the curved path 22.

In the present embodiment, the orientation assist member 30 (wheels 31a, 31b, 31c, and 31d) includes, but not limited to, Omni wheels (registered trademark). The orientation assist member 30 may include, for example, Mecanum wheels (registered trademark), free ball bearings, or casters as long as the rear half 93 of the tray 91 is moved in a direction opposite to the extended curved path 22 so as to change the conveyance orientation of the rear half 93 of the tray 91.

Alternatively, the orientation assist member 30 may include a belt conveyor. When the tray 91 is conveyed to the curved path 22, the belt conveyor may be pressed to the bottom of the tray 91 so as to assist a change of the conveyance orientation of the tray 91. In this case, the belt conveyor has a belt section that rotates in a direction at a predetermined angle with respect to the conveying direction H1 of the tray 91 on the linear path 21.

In the present embodiment, the wheels 31a, 31b, 31c, and 31d are, but not limited to, driven wheels that are rotated when the barrel-shaped rollers 33 come into contact with the tray 91. The wheels 31a, 31b, 31c, and 31d may include driving wheels that are driven by a drive motor.

In the present embodiment, the orientation assist member 30 includes, but not limited to, four rotating bodies (wheels 31a, 31b, 31c, and 31d). The number of rotating bodies is not limited to four as long as the rear half 93 of the tray 91 can be slid in a direction opposite to the extended curved path 22 so as to change the conveyance orientation of the rear half 93 of the tray 91. The orientation assist member 30 may include one to three rotating bodies or at least five rotating bodies.

In the present embodiment, the four rotating bodies (wheels 31*a*, 31*b*, 31*c*, and 31*d*) of the orientation assist member 30 are disposed, but not limited to, at equal distances with respect to the position S1 on the linear path 21. The four rotating bodies (wheels 31*a*, 31*b*, 31*c*, and 31*d*) may not be disposed at equal distances as long as the rotating bodies are located so as to be able to assist a change of the conveyance orientation of the tray 91 when the tray 91 is conveyed from the linear path 21 to the curved path 22.

In the present embodiment, the articles 90 placed on the tray 91 are conveyed by the conveyor 10, but not limited thereto. The articles 90 may be directly conveyed by the conveyor 10 without being placed on the tray 91.

REFERENCE SIGNS LIST

10 conveyor
20 transportation path
21 linear path
22 curved path
30 orientation assist member
31*a* wheel (rotating body)
31*b* wheel (rotating body)
31*c* wheel (rotating body)
31*d* wheel (rotating body)
91 tray (conveyed object)

What is claimed is:

1. A conveyor for conveying a conveyed object along a transportation path including a linear path and a curved path connected to the linear path, the conveyor comprising:
    an orientation assist member configured to assist a change of conveyance orientation of the conveyed object when the conveyed object is conveyed from the linear path to the curved path,
    wherein the curved path includes right-side rollers and left-side rollers to move the conveyed object to the curved path,
    wherein the orientation assist member is provided between the right-side rollers constituting the curved path and the left-side rollers constituting the curved path on the linear path on an upstream side of conveyance from a starting position of the curved path on the transportation path,
    wherein the orientation assist member includes a rotating body, and
    wherein the rotating body is configured to freely change a direction of rotation by combining a movement in a conveying direction of the conveyed object on the linear path and a movement in a predetermined angular direction with respect to the conveying direction of the conveyed object on the linear path.

2. The conveyor according to claim 1, wherein the orientation assist member is provided in a predetermined range around a position on the linear path, the position being separated at a predetermined distance on the upstream side of conveyance from the starting position of the curved path on the transportation path, and
    the predetermined distance is a distance corresponding to a quarter of a length of the conveyed object in a conveying direction.

3. The conveyor according to claim 1, wherein
    the rotating body is further configured to freely change the direction of rotation according to the change of the conveyance orientation of the conveyed object to the curved path to assist the change of the conveyance orientation of the conveyed object during conveyance of the conveyed object to the curved path.

4. The conveyor according to claim 3, wherein the rotating body is rotated in contact with the conveyed object.

5. The conveyor according to claim 2, wherein
    the rotating body is further configured to freely change the direction of rotation according to the change of the conveyance orientation of the conveyed object to the curved path to assist the change of the conveyance orientation of the conveyed object during conveyance of the conveyed object to the curved path.

6. The conveyor according to claim 5, wherein the rotating body is rotated in contact with the conveyed object.

7. The conveyor according to claim 1, wherein the rotating body is provided on the upstream side of conveyance from the starting position of the curved path on the transportation path such that a rear half of the conveyed object undergoes the change of the conveyance orientation to the curved path at the same time as a front half of the conveyed object undergoes the change of the conveyance orientation to the curved path.

* * * * *